(12) United States Patent
Stern-Berkowitz et al.

(10) Patent No.: US 7,092,720 B2
(45) Date of Patent: Aug. 15, 2006

(54) METHOD FOR CHARACTERIZING BASE STATION CAPABILITIES IN A WIRELESS COMMUNICATION SYSTEM AND FOR AVOIDING BASE STATION OVERLOAD

(75) Inventors: Janet Stern-Berkowitz, Little Neck, NY (US); Ana Lucia Iacono, Garden City, NY (US); Ryan Eric Drummond, Eagleville, PA (US)

(73) Assignee: InterDigital Technology Corp., Wilmington, DE (US)

( * ) Notice: Subject to any disclaimer, the term of this patent is extended or adjusted under 35 U.S.C. 154(b) by 148 days.

(21) Appl. No.: 10/810,127

(22) Filed: Mar. 26, 2004

(65) Prior Publication Data
US 2004/0192326 A1 Sep. 30, 2004

Related U.S. Application Data

(60) Provisional application No. 60/458,346, filed on Mar. 27, 2003.

(51) Int. Cl.
*H04Q 7/20* (2006.01)

(52) U.S. Cl. ............. 455/453; 455/450; 455/455; 455/509; 455/510; 455/511; 455/515; 370/329; 370/537; 370/320; 370/331; 370/333

(58) Field of Classification Search ........ 455/450–453, 455/62, 42, 2, 64, 436–422; 370/230, 234, 370/331–3, 229, 241
See application file for complete search history.

(56) References Cited

U.S. PATENT DOCUMENTS

| | | | | |
|---|---|---|---|---|
| 6,006,091 A | * | 12/1999 | Lupien | 455/435.1 |
| 6,275,695 B1 | * | 8/2001 | Obhan | 455/423 |
| 6,564,067 B1 | * | 5/2003 | Agin | 455/522 |
| 6,671,512 B1 | * | 12/2003 | Laakso | 455/453 |
| 6,957,071 B1 | * | 10/2005 | Holur et al. | 455/452.2 |

\* cited by examiner

*Primary Examiner*—Nick Corsaro
*Assistant Examiner*—Emem Ekong
(74) *Attorney, Agent, or Firm*—Volpe and Koenig, P.C.

(57) ABSTRACT

A method for characterizing base station processing and memory capabilities in a wireless communications system enables resource allocation to take these capabilities into account and to make allocations that avoid base station overload. A method for allocating resources in a wireless communication system including a base station and a radio network controller (RNC) begins by receiving an allocation request for a new service at the RNC. A set of resources is selected by the RNC to allocate to the new service, taking into account the capabilities of the base station. The allocation request is executed by the RNC if a set of resources can be found that does not exceed the capabilities of the base station.

18 Claims, 7 Drawing Sheets

METHOD FOR CHARACTERIZING BASE STATION CAPABILITIES IN A WIRELESS COMMUNICATION SYSTEM AND FOR AVOIDING BASE STATION OVERLOAD

CROSS REFERENCE TO RELATED APPLICATION(S)

This application claims priority from U.S. Provisional Application No. 60/458,346, filed Mar. 27, 2003, which is incorporated by reference as if fully set forth herein.

FIELD OF INVENTION

This invention relates generally to base station capabilities in wireless systems, and more particularly to using base station capabilities and defined characterizations for performance to avoid overloading the base station.

BACKGROUND

In a third generation partnership project (3GPP) system, there is a separation of physical and transport resource management. The radio network controller (RNC) is divided in two logical entities: the controlling RNC (C-RNC) and the serving RNC (S-RNC). The C-RNC is responsible for managing the physical resources in a cell, such as allocating timeslots and channelization codes to a specific user in the cell. The S-RNC is responsible for managing the transport channel (TrCH) parameters, such as determining the coding type, coding rate, puncturing limits, data rates, and transport block sizes. These parameters are part of the transport format combination set (TFCS) of a coded composite transport channel (CCTrCH).

In order to support a service request from the Core Network, a radio access bearer (RAB) is allocated for each service of a specific wireless transmit/receive unit (WTRU), and each RAB can be serviced by a CCTrCH. During the CCTrCH allocation, once the TFCS is determined for that service by the S-RNC, a request for physical resources is sent to the C-RNC. The C-RNC uses the TFCS as an input in order to determine the physical resource allocation for the CCTrCH. During this allocation, WTRU capabilities must be considered.

The capabilities of the WTRU are defined in classes in specification TS25.306, 3rd Generation Partnership Project (3GPP), Technical Specification Group (TSG) Radio Access Network (RAN), UE Radio Access Capabilities. Each WTRU signals its capabilities to the universal mobile telecommunication system (UMTS) terrestrial radio access network (UTRAN) RNC. WTRU manufacturers can decide which capabilities their WTRUs will support based on their own criteria, such as services to be offered, hardware cost, ASIC gate count, power consumption, etc.

However, the standards do not define a way to characterize the processing capabilities of a base station (BS). The standards also do not require the RNC to know the capabilities of the BSs and to take these capabilities into account when determining allocations for services. The RNC can make allocation requests to the Node B without taking into account BS capabilities, and it is left to the Node B to accept or reject the request. The standards also do not require the Node B to reject requests that violate BS capabilities. If the Node B does not reject a request that exceeds a BS's capabilities, the BS would likely fail to operate correctly, resulting in loss of service to existing users. The Node B is a logical entity of UTRAN which consists of one or more cells or cell sectors. In this context, a BS is the portion of the 3GPP Node B that provides the air interface and the processing for the air interface of a cell or cell sector.

Thus, it is desirable to provide a method for characterizing the BS capabilities and to use the capabilities for allocation requests and to avoid rejecting allocation requests.

SUMMARY

The present invention provides a method and system in telecommunications for defining the processing capabilities of the components, and for ensuring that those capabilities are not exceeded. The processing capabilities are defined in such a way to maximize performance and minimize cost. The present invention characterizes the BS capabilities, enables the Node B to use the capabilities to reject allocation requests, and enables the RNC to take these capabilities into account when determining allocations to request in order to avoid rejection. The present invention is applicable to layers 1, 2, and 3 in a time division duplex (TDD) scenario, as exemplified in a preferred embodiment, but is applicable to other scenarios as well.

The present invention also includes a method for using these capabilities to stagger WTRU transmissions for the purpose of maximizing throughput and for minimizing processing and memory requirements in a single RNC system. The capabilities of the BS are herein characterized in a manner similar to the way they are characterized for a WTRU in the standard TS25.306.

More specifically, a preferred embodiment of the invention includes the following different aspects. The first is a method for characterizing the processing capabilities of the hardware associated with a cell, i.e., a base station (BS). The second is a method for the Node B to reject allocation requests from the RNC which violate BS capabilities. The third is a method for allocating resources in a cell, taking into account the processing capabilities of the BS hardware. The fourth is a method for allocating resources of a cell in a manner which reduces the required processing capabilities for the same user mix and overall combined user data rate in a single RNC system.

A method for allocating resources in a wireless communication system including a base station and a radio network controller (RNC) begins by receiving an allocation request for a new service at the RNC. A set of resources is selected by the RNC to allocate to the new service, taking into account the capabilities of the base station. The allocation request is executed by the RNC if a set of resources can be found that does not exceed the capabilities of the base station.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENTS

Figure 1:
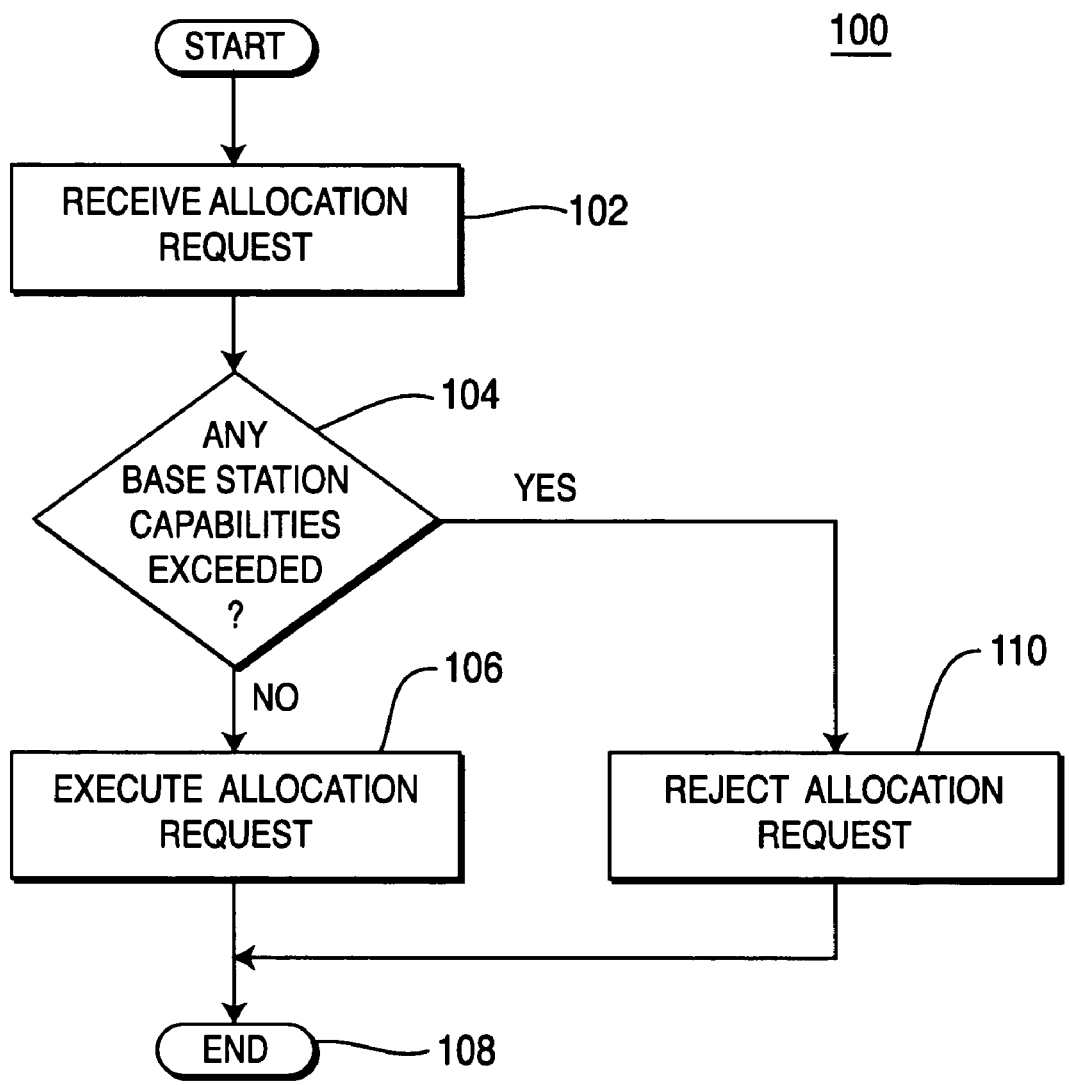
FIG. 1 is a flowchart showing an overview of using BS capabilities to determine whether to allow allocation requests at a Node B.

Hereafter, a wireless transmit/receive unit (WTRU) includes, but is not limited to, a user equipment, a mobile station, a fixed or mobile subscriber unit, a pager, or any other type of device capable of operating in a wireless environment. When referred to hereafter, a base station includes, but is not limited to, the air interface unit of a Node B, a site controller, an access point, or any other type of interfacing device in a wireless environment.

The description that follows is directed to exemplary embodiments for characterizing the processing capabilities of the hardware associated with a base station. It is noted that intersected transmission time intervals (TTIs) are TTIs that overlap in one or more frames. The present invention describes several BS capabilities, for both the UL and the DL, which are described below in connection with the context in which they are used.

Base Station Uplink Capabilities

The capabilities shown in Table 1 are those capabilities of a BS that are to be respected when performing UL allocations. It is noted that the capabilities shown in Table 1 are exemplary, and that other capabilities can be defined.

TABLE 1

| | Capability |
|---|---|
| a) | Sum of number of bits of all transport blocks that can be received within TTIs that end at the same time |
| b) | Sum of number of bits of all transport blocks that can be received in intersected TTIs |
| c) | Sum of number of bits of all convolutionally coded transport blocks that can be received within TTIs that end at the same time |
| d) | Sum of number of bits of all convolutionally coded transport blocks that can be received in intersected TTIs |
| e) | Sum of number of bits of all turbo coded transport blocks that can be received within TTIs that end at the same time |
| f) | Sum of number of bits of all turbo coded transport blocks that can be received in intersected TTIs |
| g) | Maximum number of simultaneous transport channels that can be processed |
| h) | Maximum number of simultaneous coded composite transport channels that can be processed |
| i) | Maximum number of transport blocks that can be received within TTIs that end at the same time |
| j) | Maximum number of timeslots that can be processed per frame |
| k) | Maximum number of physical channels that can be processed per timeslot |
| l) | Maximum number of physical channels that can be processed per frame |
| m) | Minimum spreading factor supported |

Base Station Downlink Capabilities

The capabilities shown in Table 2 are those capabilities of a BS that are to be respected when performing DL allocations. It is noted that the capabilities shown in Table 2 are exemplary, and that other capabilities can be defined.

TABLE 2

| | Capability |
|---|---|
| n) | Sum of number of bits of all transport blocks that can be transmitted within TTIs that start at the same time |
| o) | Sum of number of bits of all transport blocks that can be transmitted in intersected TTIs |

TABLE 2-continued

| | Capability |
|---|---|
| p) | Sum of number of bits of all convolutionally coded transport blocks that can be transmitted within TTIs that start at the same time |
| q) | Sum of number of bits of all convolutionally coded transport blocks that can be transmitted in intersected TTIs |
| r) | Sum of number of bits of all turbo coded transport blocks that can be transmitted within TTIs that start at the same time |
| s) | Sum of number of bits of all turbo coded transport blocks that can be transmitted in intersected TTIs |
| t) | Maximum number of simultaneous transport channels that can be processed |
| u) | Maximum number of simultaneous coded composite transport channels that can be processed |
| v) | Maximum number of transport blocks that can be transmitted within TTIs that start at the same time |
| w) | Maximum number of timeslots that can be processed per frame |
| x) | Maximum number of physical channels that can be processed per timeslot |
| y) | Maximum number of physical channels that can be processed per frame |
| z) | Minimum spreading factor supported |

Evaluating Allocation Requests at a Node B

Given the availability of the BS capabilities to the Node B, the Node B can reject requests for allocations that exceed any one or more of its capabilities. A high level flowchart of a method 100 to determine if an allocation request exceeds the BS capabilities is shown in FIG. 1.

The method 100 begins by receiving an allocation request at a Node B (step 102). A determination is made whether any of the BS capabilities would be exceeded if the allocation request was executed (step 104). If the BS capabilities are not exceeded by the request, then the allocation request is executed by the Node B (step 106) and the method terminates (step 108). If any of the BS capabilities would be exceeded by the request (step 104), then the allocation request is rejected by the Node B (step 110) and the method terminates (step 108).

Rejecting an allocation request (step 110) prevents the possibility of overloading the BS, which could result in a malfunction and/or service loss. The BS capabilities can be provided to the Node B by any means, such as a configuration file, operation and maintenance (O&M) download, and others.

A Method for Allocating Resources in a Cell

The BS capabilities can also be used by a method for allocating resources in a cell, by taking into account the processing capabilities of the BS hardware. The Node B should, of course, reject requests that exceed BS capabilities as described above in connection with FIG. 1. However, if the decision is left solely to the Node B, the RNC would have no insight into the reason for rejection and would have no recourse after the request is rejected. If the RNC has knowledge of the BS capabilities, the RNC could use the capabilities to determine the parameters for allocation requests to avoid exceeding the BS capabilities and to avoid rejections. The BS capabilities can be provided to the RNC by any means, such as a configuration file, operation and maintenance (O&M) download, and others.

Figure 2:
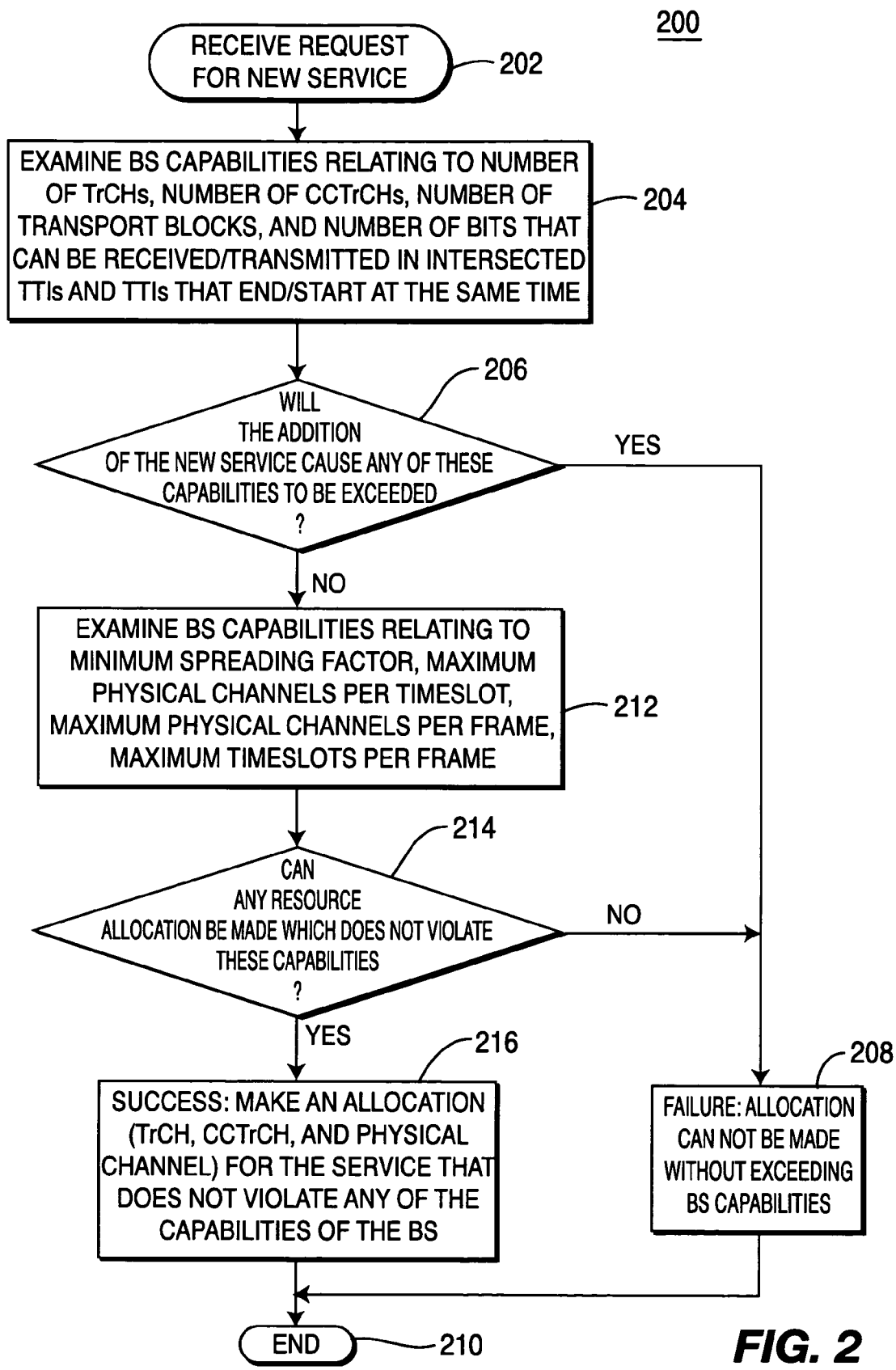
FIG. 2 is a flowchart for determining whether to allocate resources in a cell based upon BS capabilities.

A method 200 for determining whether to allocate resources in a cell based upon BS capabilities is shown in FIG. 2. It is noted that the method 200 is an exemplary embodiment and uses the capabilities defined in Tables 1 and 2. For the case where additional and/or different capabilities are applicable for a BS than the ones identified in Tables 1 and 2, the unit allocating the resources would need to take those capabilities into account when making a resource allocation.

The method 200 begins by receiving an allocation request for a new service (step 202). First, the BS capabilities relating to the number of TrCHs (capability (g) for an UL service or capability (t) for a DL service), the number of CCTrCHs (capability (h) for an UL service or capability (u) for a DL service), and the number of transport blocks (capability (i) for an UL service or capability (v) for a DL service) are examined (step 204). If the request is for an UL service, then the number of bits that can be received in intersected TTIs (capabilities (b) and (d) for a convolutionally coded service or capabilities (b) and (f) for a turbo coded service) and TTIs that end at the same time (capabilities (a) and (c) for a convolutionally coded service or capabilities (a) and (e) for a turbo coded service) are also examined as part of step 204. If the request is for a DL service, then the number of bits that can be transmitted in intersected TTIs (capabilities (o) and (q) for a convolutionally coded service or capabilities (o) and (s) for a turbo coded service) and TTIs that start at the same time (capabilities (n) and (p) for a convolutionally coded service or capabilities (n) and (r) for a turbo coded service) are also examined as part of step 204. Next, a determination is made whether the addition of the new service would cause any of the capabilities examined in step 204 to be exceeded (step 206). If any of these capabilities would be exceeded, then this indicates a failure condition because an allocation cannot be made without exceeding the BS capabilities (step 208) and the method terminates (step 210).

If the first set of capabilities is not exceeded (step 206), then the BS capabilities relating to the minimum spreading factor (capability (m) for an UL service or capability (z) for a DL service), the maximum number of physical channels per timeslot (capability (k) for an UL service or capability (x) for a DL service), the maximum number of physical channels per frame (capability (l) for an UL service or capability (y) for a DL service), and the maximum number of timeslots per frame (capability (j) for an UL service or capability (w) for a DL service) are examined (step 212). Next, a determination is made whether a resource allocation can be made that does not violate these capabilities (step 214). If no allocation can be made without violating these capabilities, then this indicates a failure condition (step 208) and the method terminates (step 210).

If a resource allocation can be made which does not violate the second set of BS capabilities (step 214), then this indicates a success condition, and the allocation is made for the service (step 216). The allocation includes TrCH, CCTrCH, and physical channel information. After the allocation is completed, the method terminates (step 210).

The RNC would not add services that require UL or DL TrCHs, CCTrCHs, or physical channels that exceed the maximums that the BS can support, i.e., a new service could only be added if all of the conditions are met, for the UL and/or DL service(s) being requested. The order of evaluating the conditions is not critical, as long as all of the conditions are met; however, some embodiments may prioritize the conditions. Typically, the conditions on the TrCHs are tested first, in the S-RNC. Then the conditions on the physical resources (timeslots, codes, spreading factor) are respected by the C-RNC when allocating the physical resources. Basically, the RNC needs to find a set of transport and physical resources that respects the BS capabilities. There are many combinations of parameters that can support the same service, and the RNC needs to choose a combination of parameters such that none of the BS capabilities are exceeded.

As an example, the RNC chooses codes (i.e., physical channels) for a CCTrCH taking into account the number of codes the BS can process per timeslot (capabilities (k) and (x) for the UL and DL, respectively). If a BS only supports 12 codes in a timeslot, the RNC must ensure that it only allocates a maximum of 12 codes per timeslot for all CCTrCHs of all WTRUs. This may require spanning a CCTrCH over multiple timeslots, which may not have been required had the BS supported 16 codes in a timeslot.

It is noted that use of the capabilities as described above is applicable to both single and multi-RNC systems. In a single RNC system, both the S-RNC and the C-RNC can have access to all of the BS capabilities and makes the decisions as follows: with respect to the BS capabilities, the S-RNC makes the TrCH and CCTrCH related decisions and the C-RNC makes the code, timeslot, and spreading factor decisions. In a multi-RNC system, the S-RNC may not have access to the information it needs to make the decisions, such as how many TrCHs and how many CCTrCHs were assigned to a BS by other RNCs. If the information is not available, it is the responsibility of the C-RNC to reject a request from the S-RNC that violates the BS's TrCH or CCTrCH capabilities.

The capabilities relating to intersecting TTIs and TTIs that start or end at the same time can be treated two ways. In the first method, the RNC evaluates how the TTIs of all CCTrCHs will coincide/overlap and ensures that none of the capabilities will be exceeded; this method is applicable in both single and multi-RNC systems. The second method, used in single RNC systems, maximizes resource usage by staggering the TTIs of different users.

The following additional method steps are performed in connection with intersecting TTIs and TTIs that start or end at the same time, and are performed after the transport channel capabilities are checked. It is desirable to allocate a cell's resources in a manner which reduces the required processing capabilities for the same user mix and overall combined user data rate in a single RNC system. For a given TrCH, the loading on the interfaces, the processing by the physical layer, and the processing memory is at its highest when the TrCH's TTIs start (on the DL) and end (on the UL). When the TTIs of all the TrCHs start and end at the same time, the requirements are at their highest.

DL TrCHs whose TTI starts coincide need to be processed to start transmission on the same air interface frame. To minimize latency, transport block sets for these TrCHs are passed through the RNC and the Node B to the physical layer at similar times and require TrCH processing at the physical layer, including coding and interleaving, in the same time window.

Similarly, in the UL, TrCHs whose TTI ends coincide have all the data for completed transport block sets received on the same air interface frame and ready for TrCH processing, including de-interleaving and de-coding, at the same time. After processing, the transport block sets are passed through the Node B and the RNC at similar times.

Reduction of this peak load can be accomplished by staggering the TTI starts (on the DL) and ends (on the UL) of the TrCHs of different WTRUs. In a preferred embodiment, two features of the standard are used for staggering the TTIs of transmissions: connection frame number-system frame number (CFN-SFN) offset and multiframe allocation, although others may be used. This embodiment provides a means to combine these features with the BS capabilities to maximize resource allocation while minimizing peak load and recognizing BS capabilities.

BS Capabilities Related to TTI Staggering

The BS capabilities relating to intersecting TTIs and TTIs that start or end at the same time are key parameters in determining the load of the BS. In the DL, one parameter specifies the sum of number of bits of all transport blocks that can be transmitted within TTIs that start at the same time (capability (n)) and another parameter specifies the sum of number of bits of all transport blocks that can be transmitted in intersected TTIs (capability (o)). Similar pairs of parameters are also provided to define limits for convolutional coding (the sum of the number of bits of all convolutionally coded transport blocks that can be transmitted within TTIs that start at the same time (capability (p)); and the sum of the number of bits of all convolutionally coded transport blocks that can be transmitted in intersected TTIs (capability (q))), and for turbo coding (the sum of the number of bits of all turbo coded transport blocks that can be transmitted within TTIs that start at the same time (capability (r)); and the sum of the number of bits of all turbo coded transport blocks that can be transmitted in intersected TTIs (capability (s))).

The reason for the two parameter types is that a BS is likely to have a limit on the number of bits it can process if all the processing has to be done at once and another limit when the processing can be spread out. As an example, suppose a BS can handle the processing of 20480 bits in TTIs that start at the same time and 40960 bits for TTIs that intersect, but do not start at the same time. With a 10 ms TTI, the BS could support a 2 Mbps service or any combination of services whose sum was less than or equal to 2 Mbps (2 Mbps×10 ms=20480 bits). With a 20 ms TTI, the BS could handle eight 128 kbps services (8×2560 bits=20480 bits per TTI) if the TTIs of the services start at the same time. The total possible service support in this case is now 1 Mbps, not 2 Mbps as above; however, eight more 128 kbps services could be supported if their TTI starts were staggered by a frame from the first set of eight services.

Similarly, in the UL, one parameter specifies the sum of number of bits of all transport blocks that can be received within TTIs that end at the same time (capability (a)) and another parameter specifies the sum of number of bits of all transport blocks that can be received in intersected TTIs (capability (b)). Similar pairs of parameters are also provided to define limits for convolutional coding (the sum of the number of bits of all convolutionally coded transport blocks that can be received within TTIs that end at the same time (capability (c)); and the sum of the number of bits of all convolutionally coded transport blocks that can be received in intersected TTIs (capability (d))), and for turbo coding (the sum of the number of bits of all turbo coded transport blocks that can be received within TTIs that end at the same time (capability (e)); and the sum of the number of bits of all turbo coded transport blocks that can be received in intersected TTIs (capability (f))).

CFN-SFN Offset

The following is an overview of the usage of CFN-SFN offset. The CFN-SFN offset is referred to as "Frame Offset" in the UTRAN and "DOFF" in the WTRU; it is used by the physical layer to map the CFN into the SFN. For simplicity of discussion, this offset will be referred to hereinafter as DOFF for both the WTRU and the UTRAN.

In both the WTRU and UTRAN, the procedure for determining the frame for transmission over the air for a transport block set (TBS) of a TrCH can be seen as a two-step process. In the first step, the medium access control (MAC) selects the CFN for transmission and sends the data to the physical layer. In the second step, the physical layer determines the SFN for transmission based on the CFN selected by the MAC and the DOFF. These two steps are independent. It is noted that WTRU implementation may use another method, such as having the MAC perform the mapping and the UTRAN may use another implementation, such as having a function in the Node B other than the physical layer in the BS perform the mapping.

The CFN selected by the MAC must be an integer multiple of the number of frames in the TTI of the TrCH. The SFN is selected by the physical layer such that it is the next SFN that satisfies the relationship:

$$CFN = (SFN - DOFF) \bmod 256 \qquad \text{Equation (1)}$$

DOFF is the same for all dedicated TrCHs in the WTRU, and is an integer from 0 to 7.

Use of DOFF to Stagger TTI Starts and Ends

In the process of resource allocation for a CCTrCH, the S-RNC determines the TFCS and requests resources from the C-RNC. The C-RNC determines the timeslots and channelization code allocation based on availability and BS code and timeslot capabilities. Based on the availability of resources, the C-RNC may also reduce the allowed TFCS. The S-RNC is responsible for deciding the value of DOFF. In a single RNC system, the DOFF value can be chosen to respect the BS capability limits for the number of bits the BS can process overall and the number of bits the BS can process in TTIs that start and end at the same time, as well as minimizing the BS load. In a multi-RNC system, the S-RNC may not have access to the information it needs in order to determine what data processing the BS is performing for WTRUs of another RNC; the C-RNC has this information.

Figure 3A:
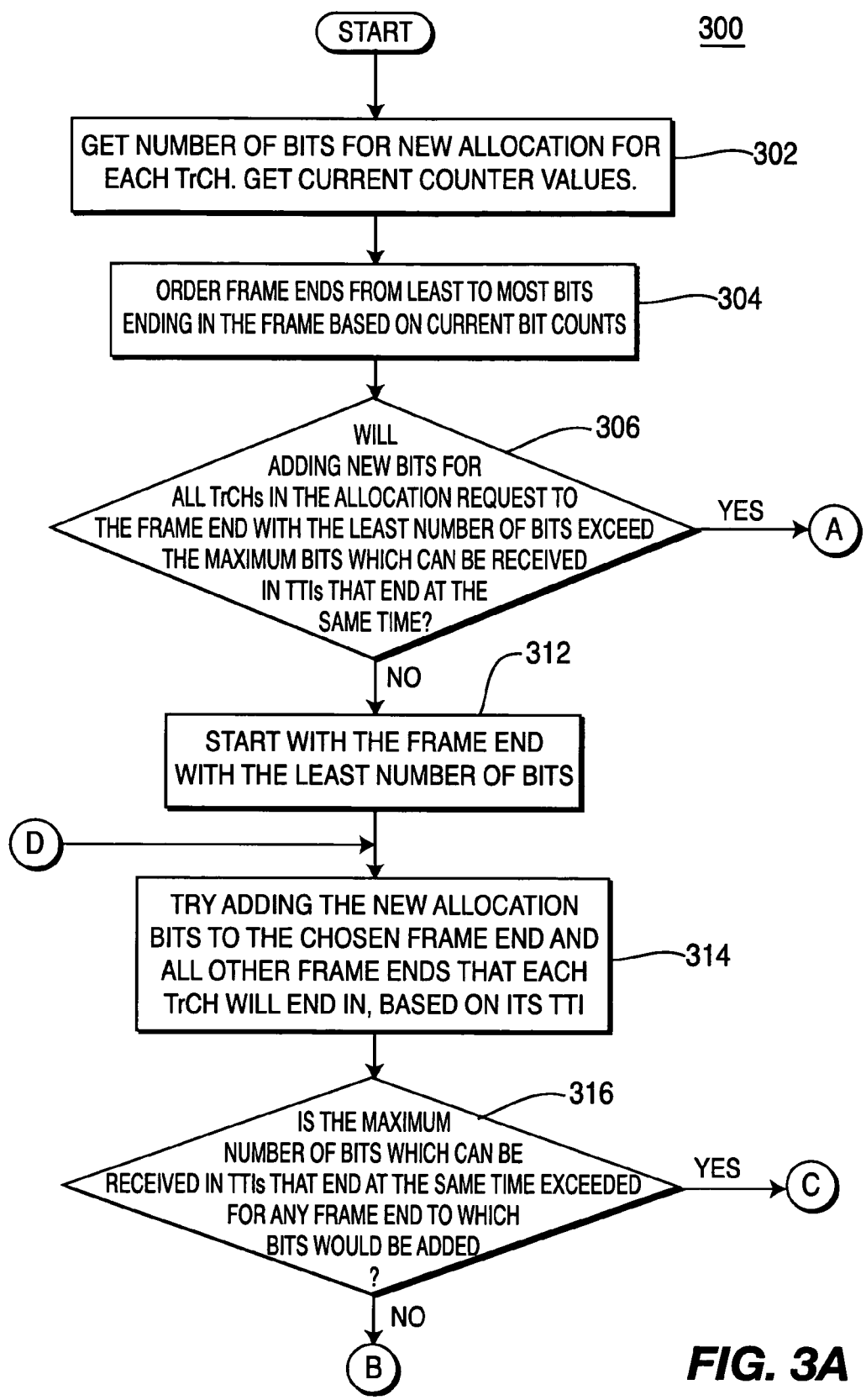
FIGS. 3a–3b are flowcharts for choosing a dedicated physical channel offset (DOFF) for an uplink (UL) CCTrCH.
Figure 3B:
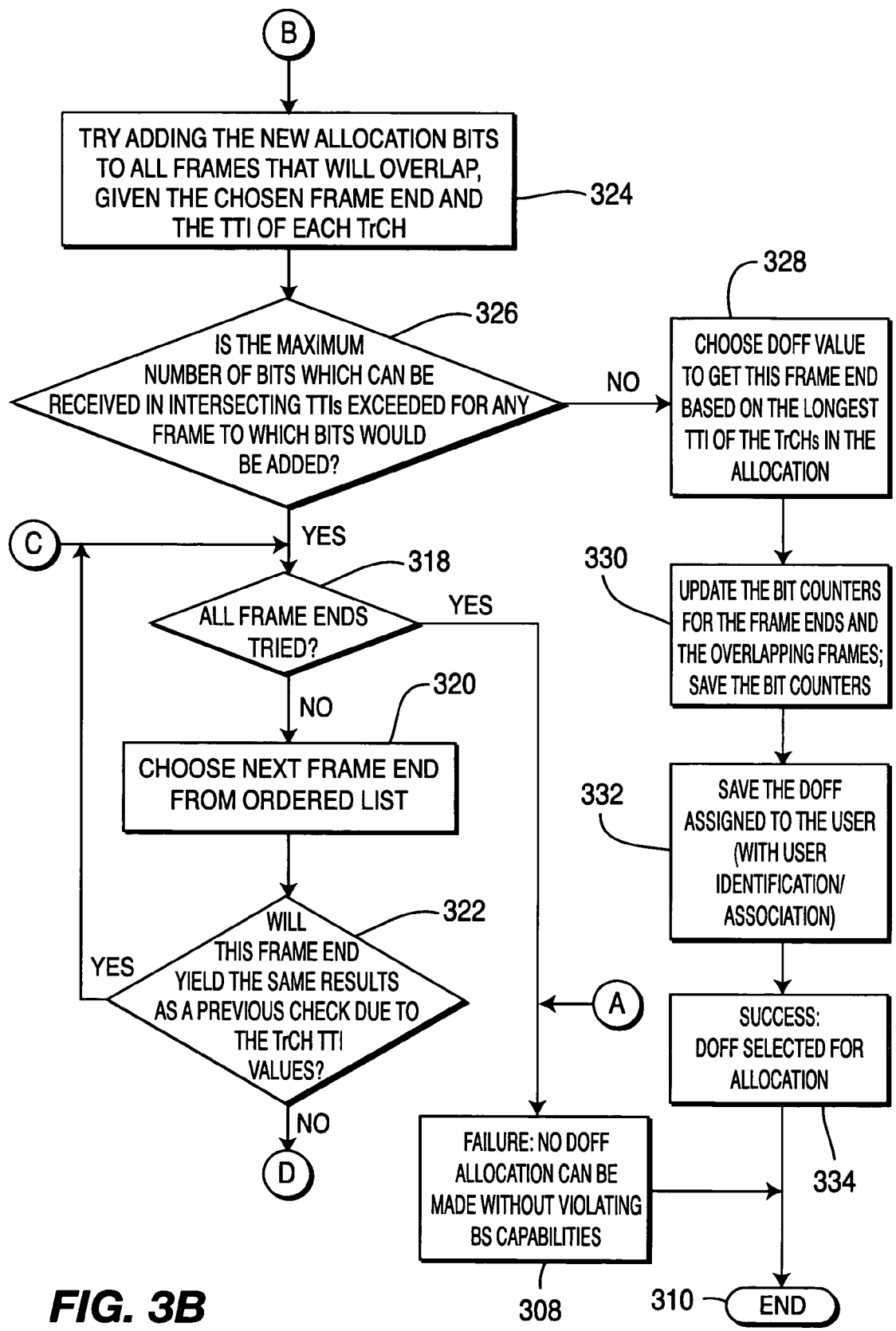

A flowchart showing an exemplary method 300 for determining DOFF for an UL CCTrCH allocation is shown in FIGS. 3a–3b. The DOFF is used to stagger the TTIs in order to reduce the required processing capabilities of a BS. The method 300 begins by obtaining the number of bits required for each TrCH in the new allocation request and retrieving the current values of the bit counters for frame ends and for overlapping frames (step 302). The frame ends, which are numbered from 0 to 7, are ordered from the least number of bits ending in the frame to the most number of bits ending in the frame, based upon the current bit counts (step 304).

Next, a determination is made whether adding the new bits for all of the TrCHs in the allocation request to the frame end with the least number of bits would exceed the maximum number of bits which can be received in TTIs that end at the same time (capabilities (a) and (c) for a convolutionally coded service or capabilities (a) and (e) for a turbo coded service; step 306). If the maximum number of bits would be exceeded, then this indicates a failure condition and no DOFF allocation can be made without violating the capabilities of the BS (step 308). The method then terminates (step 310).

If the maximum number of bits would not be exceeded (step 306), then the frame end with the least number of bits is selected (step 312). The frame end bit values that would result if the new allocation bits were added to the chosen frame end and to all other frame ends that each TrCH will end in, based upon the TrCH's TTI, are computed (step 314). A determination is made whether the maximum number of bits which can be received in TTIs that end at the same time would be exceeded for any frame end to which bits would have to be added for the new allocation (step 316).

If the maximum number of bits would be exceeded, then a determination is made whether all of the frame ends have been tried (step 318). If all of the frame ends have been tried, then this indicates a failure condition and no DOFF allocation can be made without violating the capabilities of the BS (step 308). The method then terminates (step 310). If all of the frame ends have not been tried (step 318), then the next frame end from the ordered list is chosen (step 320). A determination is made whether the currently selected frame end will yield the same results as a previous determination made in step 316 due to the TrCH's TTI values (step 322). If the results would be the same, then the method continues with step 318. If the results would be different, then the method continues with step 314.

If adding the new allocation bits would not exceed the maximum number of bits (step 316), then the overlapping frame bit values that would result if the new allocation bits were added to all frames that the TTI of each TrCH will overlap, given the chosen frame end and the TTI of each TrCH, are computed (step 324). A determination is made whether the maximum number of bits which can be received in intersecting TTIs would be exceeded for any frame to which the new allocation bits would be added (capabilities (b) and (d) for a convolutionally coded service or capabilities (b) and (f) for a turbo coded service; step 326). If the maximum number of bits would be exceeded, then the method continues with step 318. If the maximum number of bits would not be exceeded (step 326), then a DOFF value is chosen to get the current frame end based on the longest TTI of the TrCHs in the allocation (step 328). The DOFF needs to be selected such that the chosen frame end is obtained, as shown by:

$$DOFF = (\text{chosen frame end} - (\text{longest } TTI/10 \text{ ms}-1)) \mod 8 \quad \text{Equation (2)}$$

Next, the bit counters for the frame ends and the overlapping frames are updated and the bit counters are then saved (step 330). The DOFF value assigned to the user is saved, along with a user identification/association (step 332). Since a DOFF can be assigned, this indicates a success condition, and the selected DOFF can be used for allocation (step 334). The method then terminates (step 310).

When checking if the maximum number of bits which can be received in TTIs that end at the same time is exceeded (steps 306 and 316), two values must be evaluated and cannot be exceeded. In all cases, the first value to be tested is the sum of the number of bits of all transport blocks that can be received within TTIs that end at the same time (capability (a)). For convolutionally coded services, the second value to be tested is the sum of the number of bits of all convolutionally coded transport blocks that can be received within TTIs that end at the same time (capability (c)). For turbo coded services, the second value to be tested is the sum of the number of bits of all turbo coded transport blocks that can be received within TTIs that end at the same time (capability (e)).

When checking if the maximum number of bits which can be received in intersecting TTIs is exceeded (step 326), two values must be evaluated and cannot be exceeded. In all cases, the first value to be tested is the sum of the number of bits of all transport blocks that can be received in intersected TTIs (capability (b)). For convolutionally coded services, the second value to be tested is the sum of the number of bits of all convolutionally coded transport blocks that can be received in intersected TTIs (capability (d)). For turbo coded services, the second value to be tested is the sum of the number of bits of all turbo coded transport blocks that can be received in intersected TTIs (capability (f)).

For completeness, it is noted that when the CCTrCH is released, e.g., due to service termination, the frame end and overlapping frame bit counters are updated to remove the bits associated with the CCTrCH. This is not shown in FIGS. 3a and 3b.

Figure 4A:
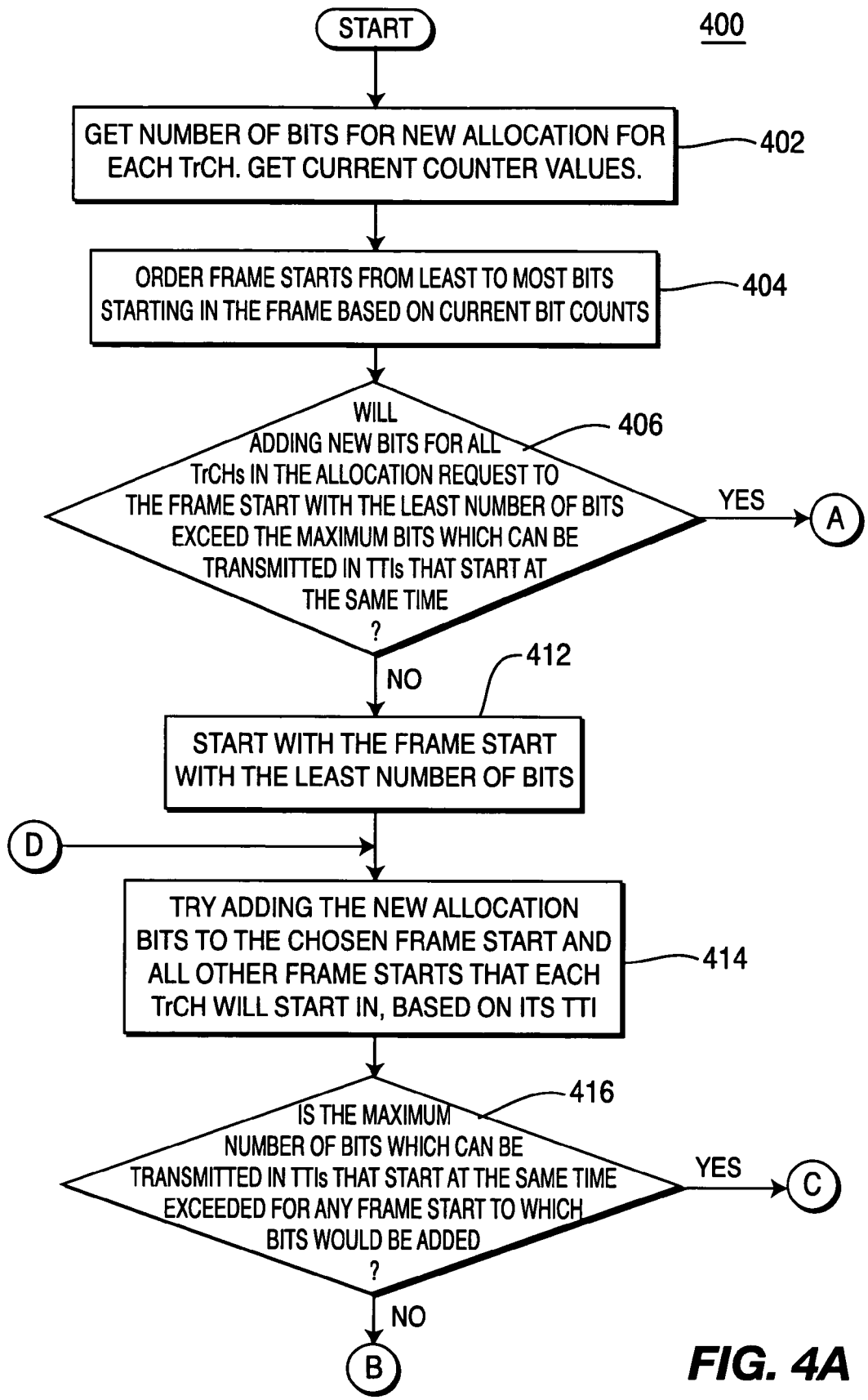
FIGS. 4a–4b are flowcharts for choosing a DOFF for a downlink (DL) CCTrCH.
Figure 4B:
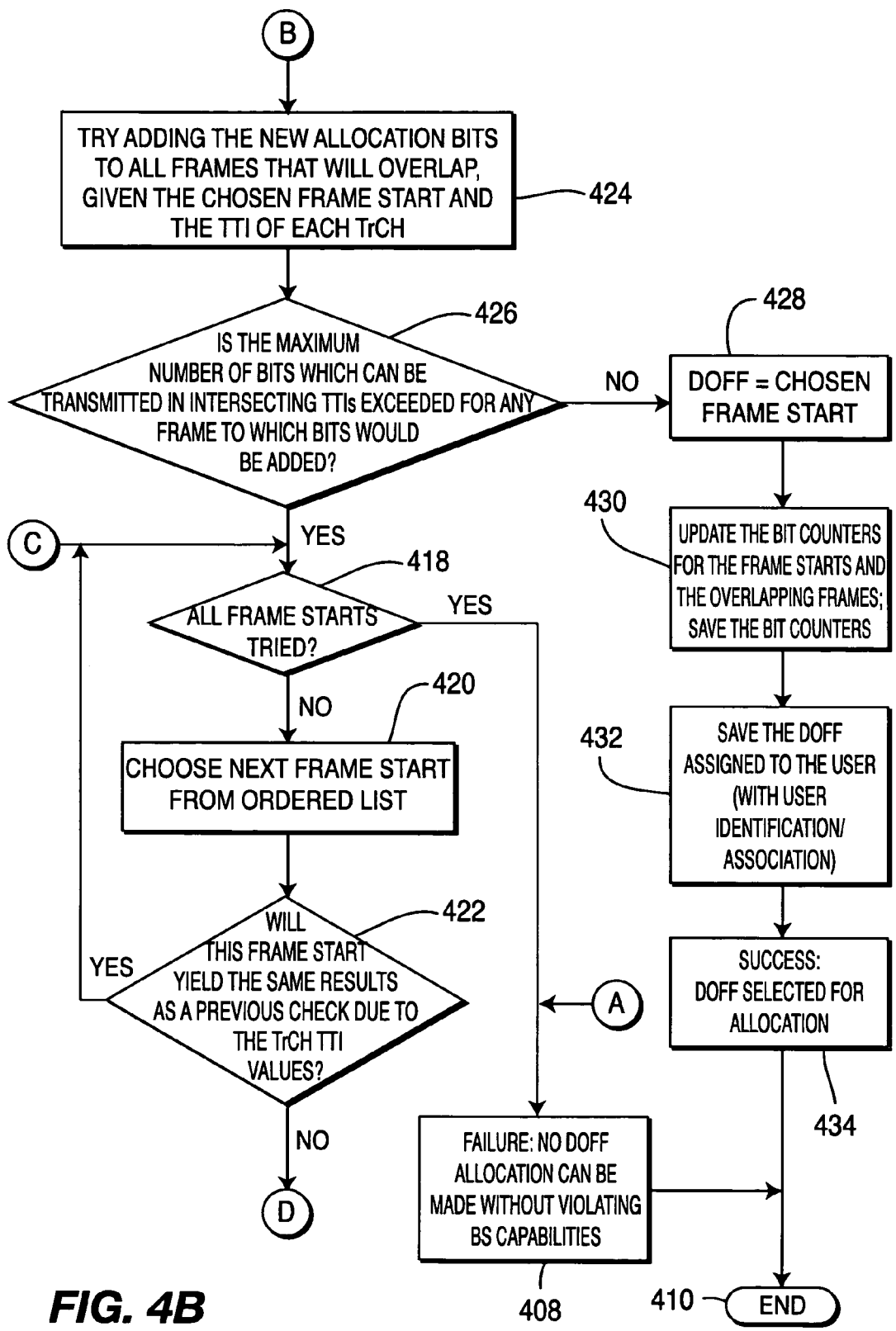

A flowchart showing a method 400 for determining DOFF for a DL CCTrCH allocation is shown in FIGS. 4a–4b. The method 400 begins by obtaining the number of bits required for each TrCH in the new allocation request and retrieving the current values of the bit counters for frame starts and for overlapping frames (step 402). The frame starts, which are numbered from 0 to 7, are ordered from the least number of bits starting in the frame to the most number of bits starting in the frame, based upon the current bit counts (step 404).

Next, a determination is made whether adding the new bits for all of the TrCHs in the allocation request to the frame start with the least number of bits would exceed the maximum number of bits which can be transmitted in TTIs that start at the same time (capabilities (n) and (p) for a convolutionally coded service or capabilities (n) and (r) for a turbo coded service; step 406). If the maximum number of bits would be exceeded, then this indicates a failure condition and no DOFF allocation can be made without violating the capabilities of the BS (step 408). The method then terminates (step 410).

If the maximum number of bits would not be exceeded (step 406), then the frame start with the least number of bits is selected (step 412). The frame start bit values that would result if the new allocation bits were added to the chosen frame start and to all other frame starts that each TrCH will start in, based upon the TrCH's TTI, are computed (step 414). A determination is made whether the maximum number of bits which can be transmitted in TTIs that start at the same time would be exceeded for any frame start to which bits would have to be added for the new allocation (step 416).

If the maximum number of bits would be exceeded, then a determination is made whether all of the frame starts have been tried (step 418). If all of the frame starts have been tried, then this indicates a failure condition and no DOFF allocation can be made without violating the capabilities of the BS (step 408). The method then terminates (step 410). If all of the frame starts have not been tried (step 418), then the next frame start from the ordered list is chosen (step 420). A determination is made whether the currently selected frame start will yield the same results as a previous determination made in step 416 due to the TrCH's TTI values (step 422). If the results would be the same, then the method continues with step 418. If the results would be different, then the method continues with step 414.

If adding the new allocation bits would not exceed the maximum number of bits (step 416), then the frame start bit values that would result if the new allocation bits were added to all frames that the TTI of each TrCH will overlap, given the chosen frame start and the TTI of each TrCH, are computed (step 424). A determination is made whether the maximum number of bits which can be transmitted in intersecting TTIs would be exceeded for any frame to which the new allocation bits would be added (capabilities (o) and (q) for a convolutionally coded service or capabilities (o) and (s) for a turbo coded service; step 426). If the maximum number of bits would be exceeded, then the method continues with step 418. If the maximum number of bits would not be exceeded (step 426), then the DOFF value is equal to the chosen frame start (step 428). The chosen frame start has a value ranging from 0 to 7.

Next, the bit counters for the frame starts and the overlapping frames are updated and the bit counters are then saved (step 430). The DOFF value assigned to the user is saved, along with a user identification/association (step 432). Since a DOFF can be assigned, this indicates a success condition, and the selected DOFF can be used for allocation (step 434). The method then terminates (step 410).

When checking if the maximum number of bits which can be transmitted in TTIs that start at the same time is exceeded (steps 406 and 416), two values must be evaluated and cannot be exceeded. In all cases, the first value to be tested is the sum of the number of bits of all transport blocks that can be transmitted within TTIs that start at the same time (capability (n)). For convolutionally coded services, the second value to be tested is the sum of the number of bits of all convolutionally coded transport blocks that can be transmitted within TTIs that start at the same time (capability (p)). For turbo coded services, the second value to be tested is the sum of the number of bits of all turbo coded transport blocks that can be transmitted within TTIs that start at the same time (capability (r)).

When checking if the maximum number of bits which can be transmitted in intersecting TTIs is exceeded (step 426), two values must be evaluated and cannot be exceeded. In all cases, the first value to be tested is the sum of the number of bits of all transport blocks that can be transmitted in intersected TTIs (capability (o)). For convolutionally coded services, the second value to be tested is the sum of the number of bits of all convolutionally coded transport blocks that can be transmitted in intersected TTIs (capability (q)). For turbo coded services, the second value to be tested is the sum of the number of bits of all turbo coded transport blocks that can be transmitted in intersected TTIs (capability (s)).

For completeness, it is noted that when the CCTrCH is released, e.g., due to service termination, the frame start and overlapping frame bit counters are updated to remove the bits associated with the CCTrCH. This is not shown in FIGS. 4a and 4b.

It should further be noted that in a system that requires the DOFF for UL and DL to be the same for a given WTRU, one DOFF must be selected, using a combination of the UL and DL procedures of methods 300 and 400, that will avoid exceeding both UL and DL BS capabilities. If no such DOFF can be found, no allocation would be made.

Special Case: Single RNC Service Addition and Reconfiguration

During service addition and reconfiguration, the DOFF is assigned per user and not per CCTrCH. It is assigned for the first CCTrCH allocated for the user and remains in effect until all CCTrCHs for the user are released. Thus, if another CCTrCH is to be added after the first, or if the existing CCTrCH is to be modified, the DOFF cannot be changed. However, it must be verified that the addition or modification of a CCTrCH will not cause the BS capabilities to be exceeded. If the addition or modification of a CCTrCH would cause the BS capabilities to be exceeded, the addition or modification will be rejected. If the addition or modification would not cause the BS capabilities to be exceeded, then the addition or modification can be made and the bit counters are updated accordingly.

Special Case: Single RNC Handover

Figure 5:
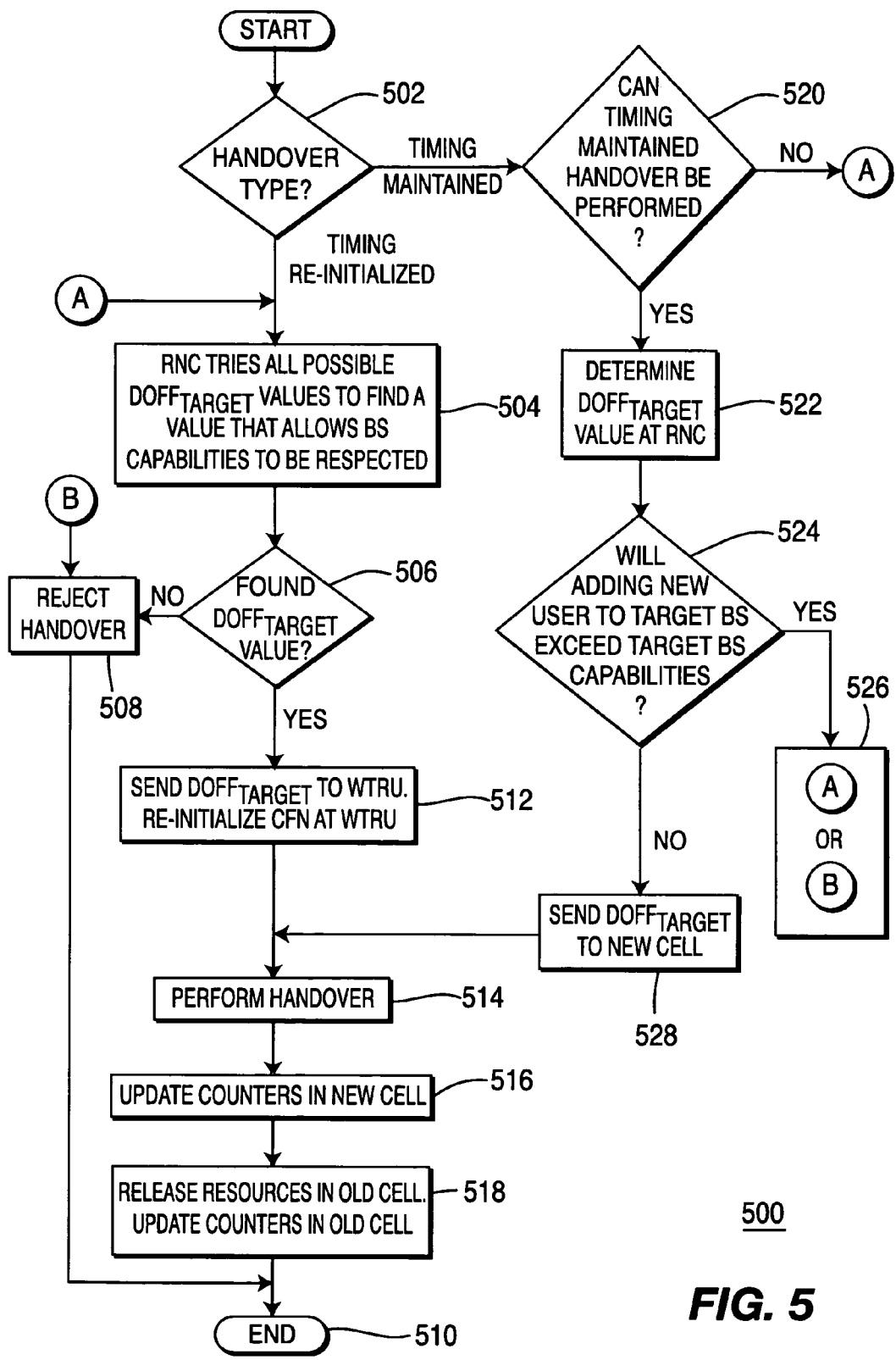
FIG. 5 is a flowchart showing a handover determination made in accordance with the present invention.

During handover, two types of handover (with respect to CFN) may occur: timing re-initialized handover or timing maintained handover. FIG. 5 shows a method 500 for determining whether to initiate a handover, taking the BS capabilities into consideration. The method 500 begins by determining the handover type (step 502).

If the handover type is timing re-initialized handover, the RNC can try all possible values for $DOFF_{target}$ (by using one of the procedures shown in FIGS. 3a–4b) to find a value that allows the BS capabilities to be respected (step 504). If no $DOFF_{target}$ can be found which allows BS capabilities to be respected (step 506), admission to the new cell is rejected (step 508), and the method terminates (step 510). If a $DOFF_{target}$ value can be found which allows BS capabilities to be respected and the user is admitted to the cell (based on any other admission criteria), then the $DOFF_{target}$ value is sent to the WTRU (step 512). In this type of handover, the CFN is re-initialized. The UTRAN sends the new DOFF value ($DOFF_{target}$) to be used by the WTRU in the target cell. The value of $DOFF_{target}$ can be the same as the one used in the previous cell, or it can be a different value. This type of handover also requires the WTRU to obtain the SFN value in the target cell ($SFN_{target}$) and then re-initialize its CFN (step 512), as follows:

$$CFN_{target} = (SFN_{target} - DOFF_{target}) \bmod 256 \qquad \text{Equation (3)}$$

The handover is performed (step 514). The counters in the new cell are updated for the addition of the user (step 516). The counters are also updated to remove the user in the old cell after the release in the old cell is completed (step 518). The method then terminates (step 510).

If the handover type (step 502) is timing maintained handover, then a determination is made whether timing maintained handover can be performed (step 520). Timing maintained handover cannot be performed if the value of $DOFF_{target}$ cannot be calculated by the RNC before the handover execution, since this value must be sent to the target cell. This would happen if the $SFN_{target}$ cannot be measured by the WTRU before handover and the RNC does not know the difference between the previous cell SFN and target cell SFN. If timing maintained handover cannot be performed, then timing re-initialized handover can be attempted instead, with the method continuing at step 504.

If timing maintained handover can be performed, the method continues at step 522. During timing maintained handover, the WTRU maintains the CFN from the previous cell. The value of $DOFF_{target}$ is determined by the RNC (step 522) as follows:

$$DOFF_{target} = (SFN_{target} - CFN) \bmod 256 \qquad \text{Equation (4)}$$

Next, a determination is made whether adding the new user to the target BS with the calculated $DOFF_{target}$ value will exceed the capabilities of the target BS (step 524). If the target BS capabilities are exceeded, timing maintained handover is not possible, and the RNC has two choices (step 526). The first choice is to reject the handover (continue the method at step 508), and the second choice is to try other values for $DOFF_{target}$, and attempt to perform a timing re-initialized handover using a value of $DOFF_{target}$ that respects the BS capabilities (continue the method at step 504). The alternative selected in step 526 is a design choice.

If the target BS capabilities are not exceeded and the user is admitted to the cell (based on any other admission criteria; step 524), the $DOFF_{target}$ value is sent to the target cell (step 528). The handover is performed (step 514). The counters in the new cell are updated for the addition of the user (step 516). The counters are also updated to remove the user in the old cell after the release in the old cell is completed (step 518). The method then terminates (step 510).

Special Case: DOFF when Multiframe Operation is used

Multiframe operation (supported by the 3GPP standards) is normally used to allow the same resources to be time-shared by multiple CCTrCHs of the same or different users.

A repetition period, repetition length, and offset are defined for the CCTrCH. For continuous allocation, the repetition period is equal to one. The methods described above for DOFF determination in connection with FIGS. 3a–4b assume continuous allocation.

For non-continuous allocation of a particular CCTrCH, other values are specified for repetition period and repetition length, and an offset is provided. These values define at which CFN values the resources can be used by the CCTrCH; frames from CFN=$CFN_{off}$ to CFN=($CFN_{off}$+repetition length−1) belong to the allocation, where $CFN_{off}$ is every frame that fulfills the following equation:

$$CFN_{off} \bmod (\text{repetition period}) = \text{offset} \quad \text{Equation (5)}$$

The possible values for repetition period are {1, 2, 4, 8, 16, 32, and 64}. The offset value is between 0 and the repetition period. The repetition length is between 1 and (repetition period−1).

For the case where multiframe operation is used, the determination of DOFF for a CCTrCH would account for the fact that the CCTrCH would only add bits in frames for which the resources belong to the CCTrCH. The determination of whether an added or modified CCTrCH could be supported with the existing DOFF would account for the fact that the CCTrCH would only add bits in frames for which the resources belong to the CCTrCH. The determination of whether a CCTrCH could be handed over to a new cell with the computed $DOFF_{target}$ would account for the fact that the CCTrCH would only add bits in frames for which the resources belong to the CCTrCH. Releasing a CCTrCH only removes bits from the bit counters in frames for which the resources belonged to the CCTrCH.

The number of frames to be included in all the capability checks (frame starts, frame ends, and frames for overlapping tests for UL and DL) would be increased to cover the longest repetition period assigned for any CCTrCH instead of being fixed at eight frames.

Special Case: Multi-RNC Handling of DOFF

Since in a multi-RNC system, the S-RNC may not know what has already been assigned for WTRUs belonging to other RNCs, it becomes the C-RNC's responsibility to verify that the DOFF selected by the S-RNC will not cause the BS capabilities to be exceeded. If the BS capabilities are exceeded, the C-RNC rejects a request for new allocation, for a service addition, or for a reconfiguration from the S-RNC.

Enhancements

The following enhancements to the procedures already defined may be implemented. In the event that a radio link cannot be established or handed over without exceeding BS data processing capabilities, the data rate for the service could be lowered (if not already at the minimum for the service) and the procedure to find a suitable DOFF for which BS capabilities are not exceeded could be repeated. A similar step could be performed when there are multiple services and data rates.

When determining the worst-case number of bits that could be added to the existing bits being processed, a simple calculation is to determine the maximum transport block set (TBS) size for each TrCH in the CCTrCH and sum these maximums together. A more accurate value for a CCTrCH with multiple TrCHs would take into account the allowed TFCs in the TFCS. Based on the allowed TFCs, the maximum sum may be less than the sum of the maximum TBS sizes.

While specific embodiments of the present invention have been shown and described, many modifications and variations could be made by one skilled in the art without departing from the scope of the invention. The above description serves to illustrate and not limit the particular invention in any way.

What is claimed is:

1. A method for allocating resources in a wireless communication system including a base station and a radio network controller (RNC), the method comprising the steps of:
   receiving an allocation request for a new service at the RNC;
   selecting a set of resources by the RNC to allocate to the new service that takes into account the capabilities of the base station, wherein the selecting step includes:
   examining a first set of base station capabilities;
   determining whether the set of resources would exceed any of the first set of capabilities;
   terminating the method if any of the first set of capabilities would be exceeded;
   examining a second set of base station capabilities; and
   determining whether the set of resources can be allocated without exceeding the second set of capabilities; and
   if a set of resources can be found that does not exceed the first set and the second set of capabilities of the base station,
   then executing the allocation request by the RNC;
   else rejecting the allocation request by the RNC.

2. The method according to claim 1, wherein the first set of base station capabilities includes:
   a number of transport channels;
   a number of coded composite transport channels; and
   a number of transport blocks.

3. The method according to claim 2, wherein if the new service is an uplink service, the first set of base station capabilities further including:
   a number of bits that can be received in intersected transmission time intervals; and
   a number of bits that can be received in transmission time intervals that end at the same time.

4. The method according to claim 2, wherein if the new service is a downlink service, the first set of base station capabilities further including:
   a number of bits that can be transmitted in intersected transmission time intervals; and
   a number of bits that can be transmitted in transmission time intervals that start at the same time.

5. The method according to claim 1, wherein the second set of base station capabilities includes:
   a minimum spreading factor;
   a maximum number of physical channels per timeslot;
   a maximum number of physical channels per frame; and
   a maximum number of timeslots per frame.

6. The method according to claim 1, further comprising the step of:
   providing the RNC with a list of the capabilities of the base station.

7. The method according to claim 6, wherein the providing step includes sending a configuration file to the RNC.

8. The method according to claim 6, wherein the providing step includes downloading operation and maintenance data to the RNC.

9. A method for evaluating an allocation request in a wireless communication system having a Node B and a base station, the method comprising the steps of:
   receiving the allocation request at the Node B;
   examining a first set of base station capabilities;

determining whether the set of resources would exceed any of the first set of capabilities;

terminating the method if any of the first set of capabilities would be exceeded;

examining a second set of base station capabilities;

determining whether the set of resources can be allocated without exceeding the second set of capabilities; and if the first set and the second set of capabilities of the base station would not be exceeded, then executing the allocation request by the Node B;

else rejecting the allocation request by the Node B.

10. The method according to claim 9, wherein the evaluating step includes:

providing the Node B with a list of the capabilities of the base station; and analyzing the capabilities required to execute the allocation request.

11. The method according to claim 10, wherein the providing step includes sending a configuration file to the Node B.

12. The method according to claim 10, wherein the providing step includes downloading operation and maintenance data to the Node B.

13. A method for allocating resources to reduce processing requirements in a wireless communication system including a base station and a single radio network controller (RNC), the method comprising the steps of:

receiving an allocation request for a new service at the RNC;

selecting a set of resources by the RNC to allocate to the new service that takes into account the capabilities of the base station;

executing the allocation request by the RNC if a set of resources can be found that does not exceed the capabilities of the base station; and staggering transmission time interval (TTI) starts and ends to spread the load on the base station between different frames, wherein the staggering step includes choosing a dedicated physical channel offset (DOFF) value for an uplink coded composite transport channel (CCTrCH) to stagger the TTI ends and choosing a DOFF value for a downlink CCTrCH to stagger the TTI starts.

14. The method according to claim 13, wherein if the DOFF value is required to be the same for both uplink and downlink services, then one DOFF value is selected such that the capabilities of the base station for both the uplink and the downlink will not be exceeded.

15. The method according to claim 13, wherein choosing a DOFF value for an uplink CCTrCH includes:

obtaining a number of bits for each transport channel in the allocation request; and choosing a DOFF value which does not cause the base station capabilities to be exceeded.

16. The method according to claim 13, wherein choosing a DOFF value for an uplink CCTrCH includes:

obtaining a number of bits for each transport channel in the allocation request; and choosing a DOFF value which will not cause base station capabilities to be exceeded and will minimize the number of bits that need to be processed by the base station in TTIs ending at the same time.

17. The method according to claim 13, wherein choosing a DOFF value for a downlink CCTrCH includes:

obtaining a number of bits for each transport channel in the allocation request; and choosing a DOFF value which does not cause the base station capabilities to be exceeded.

18. The method according to claim 13, wherein choosing a DOFF value for a downlink CCTrCH includes:

obtaining a number of bits for each transport channel in the allocation request; and choosing a DOFF value which will not cause base station capabilities to be exceeded and will minimize the number of bits that need to be transmitted by the base station in TTIs starting at the same time.

* * * * *